United States Patent
Yang et al.

(10) Patent No.: US 12,011,694 B2
(45) Date of Patent: Jun. 18, 2024

(54) CROSSLINKED PROTEIN-BASED SEPARATION MEMBRANE AND APPLICATION THEREOF

(71) Applicant: SHAANXI NORMAL UNIVERSITY, Shaanxi (CN)

(72) Inventors: Peng Yang, Shaanxi (CN); Facui Yang, Shaanxi (CN)

(73) Assignee: SHAANXI NORMAL UNIVERSITY, Shaanxi (CN)

( * ) Notice: Subject to any disclaimer, the term of this patent is extended or adjusted under 35 U.S.C. 154(b) by 65 days.

(21) Appl. No.: 17/579,209

(22) Filed: Jan. 19, 2022

(65) Prior Publication Data

US 2022/0134294 A1 May 5, 2022

Related U.S. Application Data

(63) Continuation of application No. 17/263,264, filed as application No. PCT/CN2019/085848 on May 7, 2019, now abandoned.

(30) Foreign Application Priority Data

May 14, 2018 (CN) .......................... 201810456238.3

(51) Int. Cl.
*B01D 71/44* (2006.01)
*B01D 61/24* (2006.01)
(Continued)

(52) U.S. Cl.
CPC ......... *B01D 71/441* (2022.08); *B01D 61/243* (2013.01); *B01D 67/0006* (2013.01);
(Continued)

(58) Field of Classification Search
None
See application file for complete search history.

(56) References Cited

U.S. PATENT DOCUMENTS 5,171,444 A 12/1992 Diamantoglou et al.
2019/0039028 A1* 2/2019 Wanunu ................... C02F 1/441

FOREIGN PATENT DOCUMENTS

CN 105039953 A 11/2015
CN 105153443 A 12/2015
(Continued)

OTHER PUBLICATIONS

Yan, EK., Lu, QQ., Zhang, CY. et al. Preparation of cross-linked hen-egg white lysozyme crystals free of cracks. Sci Rep 6, 34770 (2016) (Year: 2016).*

(Continued)

*Primary Examiner* — Jason M Greene
*Assistant Examiner* — Eric J McCullough
(74) *Attorney, Agent, or Firm* — HAUPTMAN HAM, LLP

(57) ABSTRACT

A crosslinked protein-based separation membrane and application thereof. The separation membrane is formed by attaching a crosslinked protein nanomembrane to a porous membrane, the crosslinked protein nanomembrane is formed by crosslinking a two-dimensional nanomembrane which is formed by phase transition of a protein with a crosslinking agent, the separation membrane contains a dense surface layer and a support layer, the dense surface layer is the crosslinked protein nanomembrane, and the support layer is the porous membrane; the protein is any one of lysozyme, bovine serum albumin, insulin, and α-lactalbumin; the crosslinked protein-based separation membrane has a good biocompatibility, may serve as a dialysis membrane for blood purification, and has a higher retention ratio for large molecular proteins.

1 Claim, 3 Drawing Sheets

(51) Int. Cl.
    *B01D 67/00*    (2006.01)
    *B01D 69/10*    (2006.01)
    *B01D 69/12*    (2006.01)
    *B01D 71/48*    (2006.01)

(52) U.S. Cl.
    CPC ..... *B01D 67/0093* (2013.01); *B01D 69/1071* (2022.08); *B01D 69/1251* (2022.08); *B01D 71/48* (2013.01); *B01D 2325/0283* (2022.08); *B01D 2325/04* (2013.01)

(56) References Cited

FOREIGN PATENT DOCUMENTS

| CN | 105204291 | A | | 12/2015 | |
|---|---|---|---|---|---|
| CN | 105296977 | A | | 2/2016 | |
| CN | 105475359 | A | | 4/2016 | |
| CN | 105776179 | A | | 7/2016 | |
| CN | 107174983 | A | | 9/2017 | |
| CN | 108854599 | A | | 11/2018 | |
| CN | 105475359 | B | * | 6/2020 | ............ A01N 25/34 |
| JP | H06113829 | A | * | 4/1994 | |
| WO | WO-2008046630 | A1 | * | 4/2008 | ......... A61B 5/14528 |

OTHER PUBLICATIONS

Polina Vakuliuk, et al., Modified track membranes with antibacterial properties, Desalination, vol. 235, Issues 1-3, 2009, pp. 160-169 (Year: 2009).*
International Search Report issued in corresponding International Application No. PCT/CN2019/085848; dated Aug. 5, 2019; State Intellectual Property Office of the P.R. China, Beijing, China, 6 pgs.
International Preliminary Report on Patentability issued in corresponding International Application No. PCT/CN2019/085848; dated Oct. 30, 2020; State Intellectual Property Office of the P.R. China, Beijing, China, 19 pgs.
Search Report issued in corresponding Chinese Application No. 201810456238.3; dated Feb. 27, 2020; 2 pgs.
Office Action issued in corresponding Chinese Application No. 201810456238.3; dated Mar. 6, 2020; 11 pgs.
Notification to Grant issued in corresponding Chinese Application No. 201810456238.3; dated Aug. 6, 2020; 3 pgs.
Polina Vakuliuk, Anatoliy Burban, Victorya Konovalova, Mihaila Bryk, Marina Vortman, Nina Klymenko, Valeriy Shevchenko, Modified track membranes with antibacterial properties, Desalination, vol. 235, Issues 1-3, 2009, pp. 160-169 (Year: 2009).
Yang, Facui et al., "Self-assembled membrane composed of amyloid like proteins for efficient size-selective molecular separation and dialysis" Nature Communications, (2018) 9:5443; Published: Dec. 21, 2018; 11 pgs.
Wang, Dehui et al; "2D Protein Supramolecular Nanofilm with Exceptionally Large Area and Emergent Functions." Advanced Materials (Deerfield Beach, Fla.), Jun. 23, 2016, 28(34): 7414-7423; 61 pgs.

* cited by examiner

CROSSLINKED PROTEIN-BASED SEPARATION MEMBRANE AND APPLICATION THEREOF

RELATED APPLICATIONS

The present application is a Continuation of U.S. application Ser. No. 17/263,264, filed Jan. 26, 2021, which is a National Phase of International Application Number PCT/CN2019/085848 filed May 7, 2019, and claims priority to Chinese Application Number 201810456238.3 filed May 14, 2018, the contents of all are hereby incorporated by reference in their entireties.

TECHNICAL FIELD

The present invention relates to a separation membrane, and specifically, to a green and mild separation membrane with easy preparation and a controllable pore size, and uses of the separation membrane.

BACKGROUND

Due to the characteristics such as high separation efficiency, no secondary pollution, and easy operation, the membrane separation technology has been widely applied to petrochemical engineering, sewage treatment, medicine and health, food processing, and other fields currently. The membrane material is one of the essentials of the membrane separation technology. At present, the common membrane materials mainly include organically synthetic polymers. However, the preparation method of polymer membranes is complex; and generally, organic substances (such as, protein, colloid and microorganism) are easily adsorbed in a feed solution during separation; the protein nonspecific adsorption on the surface of a membrane further causes negative effects, such as blood coagulation while being in contact with blood, resulting in reducing the flux and selection of the separation membrane. Hemodialysis treatment is one of the common treatment means to treat uremia patients. The purpose of the blood purification membrane is to achieve exchange of substances mainly through diffusion/convection principles, thus cleaning up metabolic wastes and excessive moisture, and maintaining electrolyte in the body. However, medium to large molecular toxins cannot be cleaned up by a conventional hemodialysis membrane. Therefore, it is of practical significance to develop a low-cost separation membrane with good separation performances and easy preparation.

The selective separation membrane was prepared by self-assembly of nanostructure materials has been a new attempt in the field of separation membranes in recent years. Up to now, most of the nanocomposite membranes with permselectivity have been not manufactured in mass production for industrial application.

SUMMARY OF THE INVENTION

Technical Problem

The technical problem to be solved by the present invention is to provide a crosslinked protein-based separation membrane and application thereof directed to the defects of the prior art mentioned above.

Technical Solution

To solve the above technical problem, the crosslinked protein-based separation membrane is formed by attaching a crosslinked protein nanomembrane to a porous membrane, the crosslinked protein nanomembrane is formed by crosslinking a two-dimensional nanomembrane which is formed by phase transition of a protein with a crosslinking agent, the separation membrane contains a dense surface layer and a support layer, the dense surface layer is the crosslinked protein nanomembrane, and the support layer is the porous membrane.

The above protein is any one of lysozyme, bovine serum albumin, insulin, and α-lactalbumin.

When the above protein is a lysozyme, a method of forming a lysozyme two-dimensional nanomembrane by phase transition of the lysozyme comprises: adjusting a pH value of a 10-100 mmol/L 2-[4-(2-hydroxyethyl)piperazin-1-yl]ethanesulfonic acid buffered solution of tris(2-carboxyethyl) phosphine to 6.0-8.0 by using NaOH to get an adjusted solution; then, mixing the adjusted solution with a 1-30 mg/mL 2-[4-(2-hydroxyethyl)piperazin-1-yl]ethanesulfonic acid buffered solution of the lysozyme in an isovolumetric manner to get a mixed solution, spreading the mixed solution to a whole surface of a substrate directly; and incubating at room temperature for 2-6 hours to, forming a layer of the lysozyme two-dimensional nanomembrane on a gas-liquid interface of a liquid on the substrate.

When the above protein is any one of bovine serum albumin, insulin, and α-lactalbumin, a method of forming a two-dimensional nanomembrane by phase transition of the protein comprises: adjusting a pH value of a 10-100 mmol/L 2-[4-(2-hydroxyethyl)piperazin-1-yl]ethanesulfonic acid buffered solution of tris(2-carboxyethyl)phosphine to 4.0-6.0 by using NaOH to get an adjusted solution, then mixing the adjusted solution with a 1-30 mg/mL 2-[4-(2-hydroxyethyl)piperazin-1-yl]ethanesulfonic acid buffered solution of the protein in an isovolumetric manner to get a mixed solution, spreading the mixed solution to a whole surface of a substrate directly, incubating at room temperature for 2-6 hours, forming a layer of a protein two-dimensional nanomembrane on a gas-liquid interface of a liquid on the substrate.

The method of crosslinking the two-dimensional nanomembrane which is formed by phase transition of the protein with the crosslinking agent comprises: transferring the two-dimensional nanomembrane to a crosslinking agent aqueous solution with a mass fraction of 0.2%-2% for crosslinking for 2-6 hours at room temperature; where the crosslinking agent is any one of glutaraldehyde, Genipin, glutamine transaminase and carbodiimide.

The above porous membrane is any one of a PET nuclear track membrane, a PC membrane, a PP membrane, a PSF membrane, and a PTFE membrane; and a pore size of the porous membrane is in a range of 0.22-10 μm.

The crosslinked protein-based separation membrane of the present invention may serve as a dialysis membrane or an ultrafiltration membrane for use.

For use of the crosslinked protein-based separation membrane of the present invention as a dialysis membrane in the separation of mixed proteins, the mixed proteins are, for example, bovine serum albumin and insulin, or muscle hemoglobin and insulin.

For use of the crosslinked protein-based separation membrane of the present invention as a dialysis membrane in the separation of mixed dyes, the mixed dyes are, for example, methyl blue and methyl orange, or methyl blue and Rhodamine B.

For use of the crosslinked protein-based separation membrane of the present invention as a dialysis membrane in the removal of urotoxin by hemodialysis, the urotoxin is a toxin having a relative molecular weight less than 500, such as urea, creatinine, and a medium molecular toxin having a relative molecular weight in the range of 500 to 20000, such as β-microglobulin, parathormone, leptin, renin and protein binding toxin indoxyl sulfate, and the like.

Beneficial effects of the present invention are as follows:
1. The separation membrane of the present invention is densely-piled by oligomers of a protein, colorless and transparent, and is a pure protein membrane. The thickness of the membrane can be controlled according to the concentration of the protein, and the pore size decreases to 1.8 nm from 3.4 nm with the increase of the membrane thickness.
2. The separation membrane of the present invention has good biocompatibility; and thus can serve as a dialysis membrane for blood purification to clean up urea, creatinine, and medium to large molecular toxins, indoxyl sulfate, and the like; and moreover the separation membrane has higher retention ratio to macromolecular proteins. Therefore, the separation membrane is a more ideal dialysis membrane material.
3. The separation membrane of the present invention can efficiently separate different sizes of mixed proteins and mixed dyes, such as bovine serum albumin, insulin, muscle hemoglobin and insulin, methyl blue and methyl orange, methyl blue and Rhodamine B.
4. The separation membrane of the present invention is easy to prepare on a large scale, has the characteristics of low cost, low energy consumption, environmental friendliness and the like, and is free of the step complicatedness and environmental pollution problems in traditional synthetic procedures of a polymer membrane.

DETAILED DESCRIPTION OF THE INVENTION

The Best Embodiment of the Invention

Embodiment 1

Figure 1:
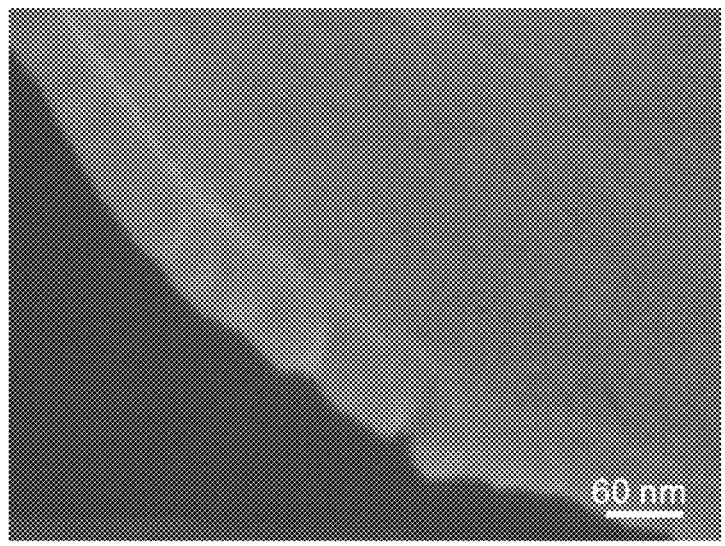
FIG. 1 is a diagram of a scanning electron micrograph of a crosslinked lysozyme nanomembrane in Embodiment 1.

A pH value of a 60 μL 50 mmol/L 2-[4-(2-hydroxyethyl) piperazin-1-yl]ethanesulfonic acid buffered solution of tris (2-carboxyethyl) phosphine was adjusted to 7.0 by using NaOH; and then, the adjusted solution was mixed, in an isovolumetric manner, with a 60 μL 2 mg/mL 2-[4-(2-hydroxyethyl)piperazin-1-yl]ethanesulfonic acid buffered solution of lysozyme evenly before directly spreading a resulting mixture to a whole surface of a 18 mm×18 mm cover glass; and the mixed solution was incubated at room temperature for 2 hours to form a layer of lysozyme two-dimensional nanomembrane on a gas-liquid interface of a liquid on the cover glass; the lysozyme two-dimensional nanomembrane on the gas-liquid interface was transferred to an glutaraldehyde aqueous solution having a mass fraction of 1%, and then crosslinked for 2 hours at room temperature to obtain a crosslinked lysozyme nanomembrane.

The above crosslinked lysozyme nanomembrane was attached on a PET nuclear track membrane with a diameter of 25 mm, a thickness of 12 μm and a pore size of 10 μm to obtain a dialysis membrane with the crosslinked lysozyme nanomembrane as a dense surface layer and the PET nuclear track membrane as a support layer.

The Embodiments of the Invention

Embodiment 2

In this embodiment, 2 mg/mL 2-[4-(2-hydroxyethyl)piperazin-1-yl]ethanesulfonic acid buffered solution of lysozyme in Embodiment 1 was replaced with an isovolumetric 4 mg/mL 2-[4-(2-hydroxyethyl)piperazin-1-yl]ethanesulfonic acid buffered solution of lysozyme; and other steps were the same as those of Embodiment 1 to obtain a dialysis membrane.

Embodiment 3

In this embodiment, 2 mg/mL 2-[4-(2-hydroxyethyl)piperazin-1-yl]ethanesulfonic acid buffered solution of lysozyme in Embodiment 1 was replaced with an isovolumetric 6 mg/mL 2-[4-(2-hydroxyethyl)piperazin-1-yl]ethanesulfonic acid buffered solution of lysozyme; and other steps were the same as those of Embodiment 1 to obtain a dialysis membrane.

Embodiment 4

In this embodiment, 2 mg/mL 2-[4-(2-hydroxyethyl)piperazin-1-yl]ethanesulfonic acid buffered solution of lysozyme in Embodiment 1 was replaced with an isovolumetric 8 mg/mL 2-[4-(2-hydroxyethyl)piperazin-1-yl]ethanesulfonic acid buffered solution of lysozyme; and other steps were the same as those of Embodiment 1 to obtain a dialysis membrane.

Embodiment 5

In this embodiment, 2 mg/mL 2-[4-(2-hydroxyethyl)piperazin-1-yl]ethanesulfonic acid buffered solution of lysozyme in Embodiment 1 was replaced with an isovolumetric 10 mg/mL 2-[4-(2-hydroxyethyl)piperazin-1-yl]ethanesulfonic acid buffered solution of lysozyme; and other steps were the same as those of Embodiment 1 to obtain a dialysis membrane.

Embodiment 6

In this embodiment, 2 mg/mL 2-[4-(2-hydroxyethyl)piperazin-1-yl]ethanesulfonic acid buffered solution of lysozyme in Embodiment 1 was replaced with an isovolumetric 20 mg/mL 2-[4-(2-hydroxyethyl)piperazin-1-yl]ethanesulfonic acid buffered solution of lysozyme; and other steps were the same as those of Embodiment 1 to obtain a dialysis membrane.

Embodiment 7

In this embodiment, 2 mg/mL 2-[4-(2-hydroxyethyl)piperazin-1-yl]ethanesulfonic acid buffered solution of lysozyme in Embodiment 1 was replaced with an isovolumetric 30 mg/mL 2-[4-(2-hydroxyethyl)piperazin-1-yl]ethanesulfonic acid buffered solution of lysozyme; and other steps were the same as those of Embodiment 1 to obtain a dialysis membrane.

Figure 2:
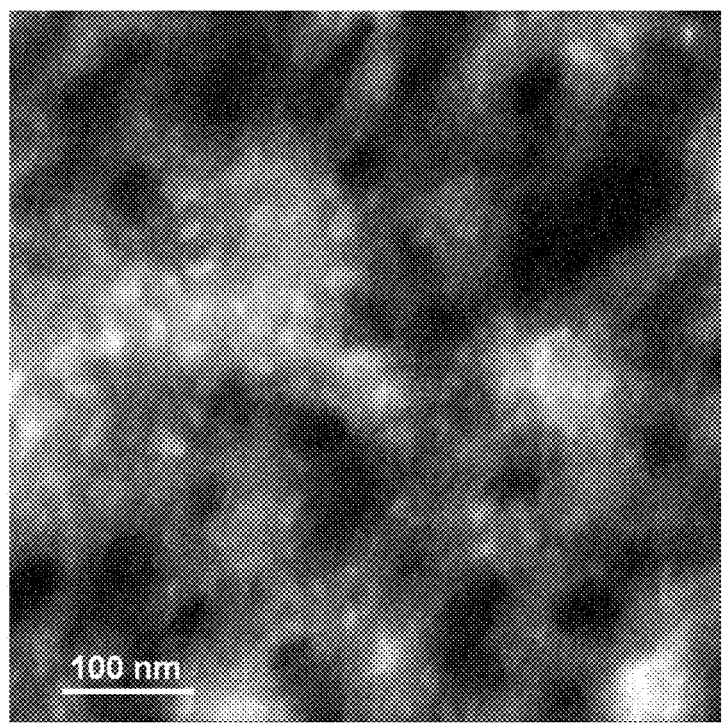
FIG. 2 is a planar diagram of a transmission electron microscope (TEM) of the crosslinked lysozyme nanomembrane in Embodiment 1.
Figure 3:
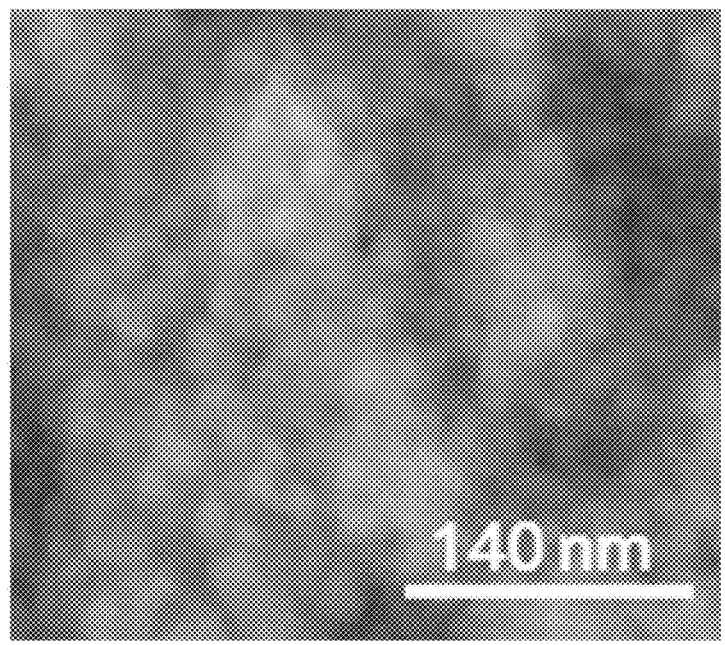
FIG. 3 is a diagram of an atomic force microscope (AFM) of the crosslinked lysozyme nanomembrane in Embodiment 1.
Figure 4:
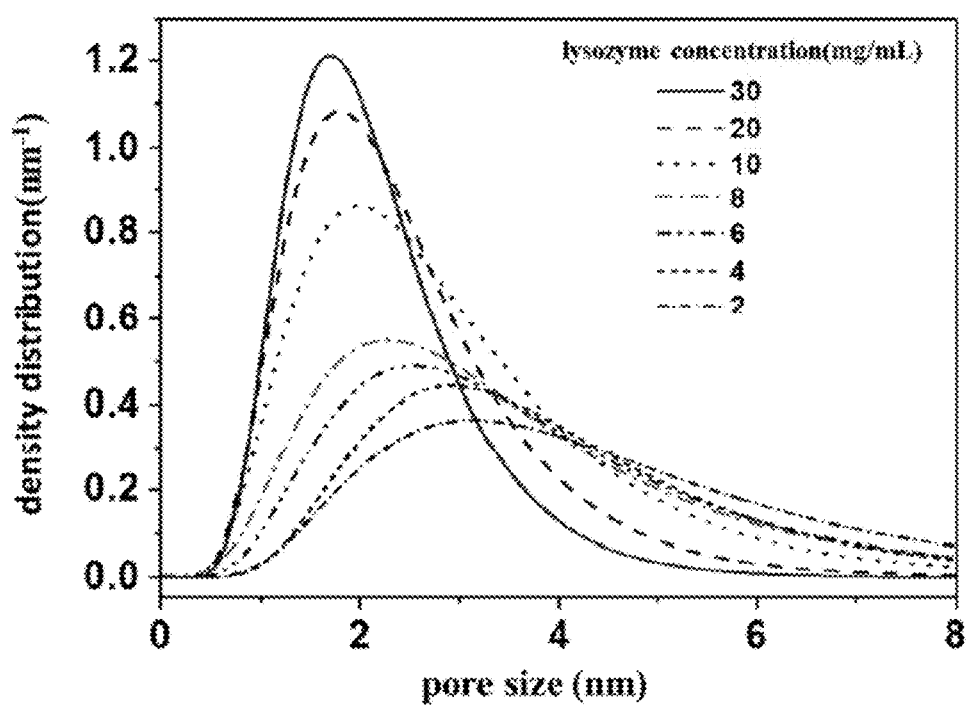
FIG. 4 shows pore size distribution of crosslinked lysozyme nanomembranes with different thicknesses.

The inventor performed SEM characterization on the crosslinked lysozyme nanomembranes prepared in Embodiments 1-7; and the results showed that the thicknesses of the corresponding films were successively 50 nm (see FIG. 1), 60 nm, 90 nm, 100 nm, 120 nm, 220 nm and 250 nm; and the nanomembranes were densely-piled by 20 nm oligomers after phase transition of lysozyme (as shown in FIG. 2 and FIG. 3). The area of the prepared crosslinked lysozyme nanomembrane was controlled by a PET with a pore size of 6 mm; the membrane was made to float on 5 mL ultrapure water; and then 50 μL 0.5 mg/mL PEG with different molecular weights was dropwisely added on the membrane; then an UV-Vis absorption spectrum was used to monitor the permeability of the solution standing for around 24 hours, and to analyze the pore size distribution of the membrane; and the results were shown in FIG. 4. The pore size distribution of the membrane was obtained by fitting the retention ratios of the membrane for different molecular weights; and the pore size of the membrane decreased to 1.8 nm from 3.4 nm with the increase of the membrane thickness.

Embodiment 8

Use of the dialysis membrane of Embodiment 1 in the separation of methyl blue and methyl orange, methyl blue and Rhodamine B, muscle hemoglobin and insulin, bovine serum albumin and insulin was specifically as follows:

a dialysis membrane was made to float on 5 mL ultrapure water; and the membrane was separately dropwisely added with a 50 μL aqueous solution containing 50 mg/L methyl blue and 50 mg/L methyl orange, a 50 μL aqueous solution containing 50 mg/L methyl blue and 50 mg/L Rhodamine, a 50 μL aqueous solution containing 10 g/L muscle hemoglobin and 10 g/L insulin, and a 50 μL aqueous solution containing 10 g/L bovine serum albumin and 10 g/L insulin; after the solution stood for 24 hours at room temperature, the permeability of the solution was monitored by an UV Vis absorption spectrum. The experimental results show that the dialysis membrane can completely pass through molecules having a molecular diameter of less than 2 nm; moreover, the methyl blue, bovine serum albumin and muscle hemoglobin having a molecular diameter of more than 3 nm and carrying negative charges can be completely intercepted; the retention ratio of methyl orange is merely 0.3%, the retention ratio of Rhodamine B is 1.4%, and the retention ratio of insulin is 22.6%. The diffusion rate of methyl orange is up to 606 nmol cm$^{-2}$ h$^{-1}$, and the diffusion rate of Rhodamine B is 308 nmol cm$^{-2}$ h$^{-1}$. Therefore, the membrane can achieve the rapid and effective separation from methyl blue and methyl orange, methyl blue and Rhodamine, muscle hemoglobin and insulin, bovine serum albumin and insulin.

Embodiment 9

Figure 5:
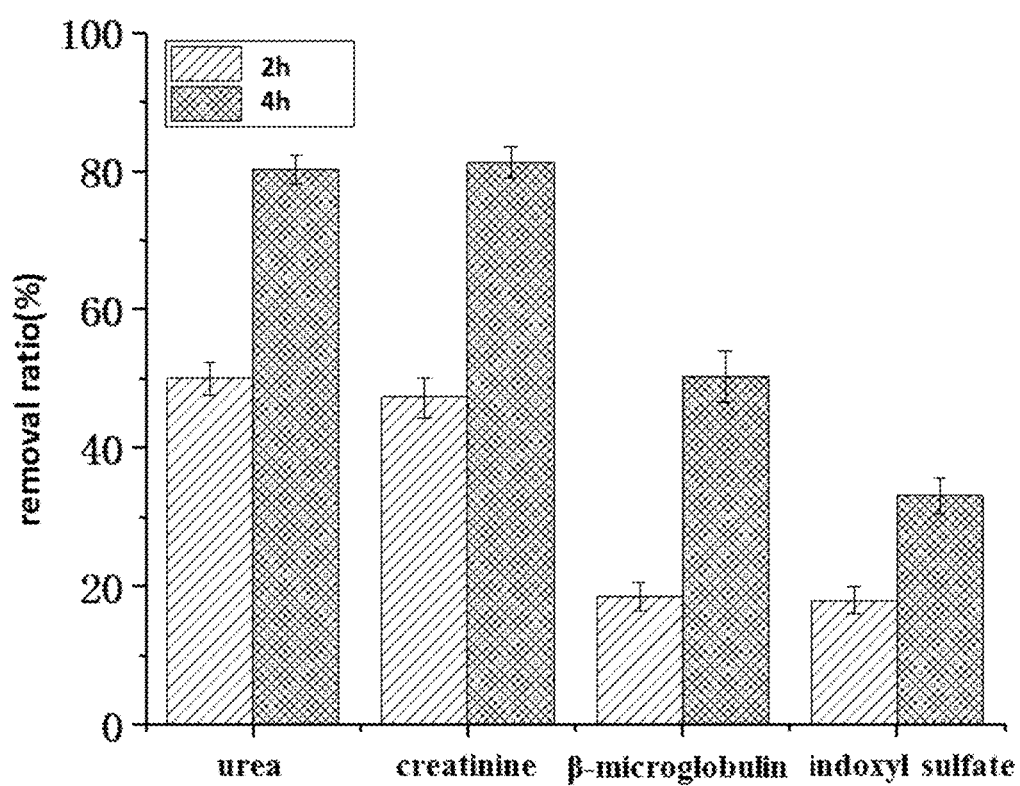
FIG. 5 shows the removal of urea, indoxyl sulfate, creatinine and β-microglobulin by a dialysis membrane obtained from Embodiment 1.

Use of the dialysis membrane of Embodiment 1 in the removal of urea, creatinine, β-microglobulin and indoxyl sulfate was specifically as follows:

the simulation solution was an aqueous solution containing 1 mg/mL bovine serum albumin, 25 mg/L indoxyl sulfate, 40 mg/L β-microglobulin, 100 mg/L creatinine and 1.5 mg/mL urea; flow velocity of the simulation solution and dialysis fluid (water) was 10 mL/min; and dialysis was conducted for 4 hours with a dialysis membrane. The removal ratio of the dialysis membrane for bovine serum albumin, indoxyl sulfate, β-microglobulin, creatinine and urea was tested. As shown in FIG. 5, the dialysis membrane can intercept the macromolecular bovine serum albumin; and has better removal effects for indoxyl sulfate, urea, β-microglobulin, and creatinine; and the removal ratios were respectively 33.1%, 82.2%, 50.3% and 81.3%.

Embodiment 10

A pH value of a 60 μL 50 mmol/L 2-[4-(2-hydroxyethyl)piperazin-1-yl]ethanesulfonic acid buffered solution of tris (2-carboxyethyl) phosphine was adjusted to 5.0 by using NaOH; and then, the adjusted solution was mixed with a 60 μL 5 mg/mL 2-[4-(2-hydroxyethyl)piperazin-1-yl]ethanesulfonic acid buffered solution of bovine serum albumin evenly before directly spreading a resulting mixture to a whole surface of a 18 mm×18 mm cover glass; and the mixed solution was incubated at room temperature for 2 hours to form a layer of bovine serum albumin two-dimensional nanomembrane on a gas-liquid interface of a liquid on the cover glass; the bovine serum albumin two-dimensional nanomembrane on the gas-liquid interface was transferred to a Genipin aqueous solution having a mass fraction of 1%, and then crosslinked for 2 hours at room temperature to obtain a crosslinked bovine serum albumin nanomembrane. The obtained crosslinked bovine serum albumin nanomembrane was attached on a PC membrane with a diameter of 25 mm, a thickness of 12 μm and a pore size of 10 μm to obtain a dialysis membrane with the crosslinked bovine serum albumin nanomembrane as a dense surface layer and the PC membrane as a support layer. The use of the dialysis membrane in the removal of urea, creatinine, β-microglobulin and indoxyl sulfate was the same as that in Embodiment 9. The experimental results show that the dialysis membrane can intercept the macromolecular bovine serum albumin; and has better removal effects for indoxyl sulfate, urea, β-microglobulin, and creatinine; and the removal ratios were respectively 44.2%, 90.2%, 60.4% and 88.6%.

Embodiment 11

A pH value of a 60 μL 50 mmol/L 2-[4-(2-hydroxyethyl)piperazin-1-yl]ethanesulfonic acid buffered solution of tris (2-carboxyethyl) phosphine was adjusted to 4.0 by using NaOH; and then, the adjusted solution was mixed with a 60 μL 2 mg/mL 2-[4-(2-hydroxyethyl)piperazin-1-yl]ethanesulfonic acid buffered solution of α-lactalbumin evenly before directly spreading a resulting mixture to a whole surface of a 18 mm×18 mm cover glass; and the mixed solution was incubated at room temperature for 2 hours to form a layer of α-lactalbumin two-dimensional nanomembrane on a gas-liquid interface of a liquid on the cover glass; the α-lactalbumin two-dimensional nanomembrane on the gas-liquid interface was transferred to a glutamine transaminase aqueous solution having a mass fraction of 1%, and then crosslinked for 2 hours at room temperature to obtain a crosslinked α-lactalbumin nanomembrane. The obtained crosslinked α-lactalbumin nanomembrane was attached on a PP membrane with a diameter of 25 mm, a thickness of 12

μm and a pore size of 10 μm to obtain a dialysis membrane with the crosslinked α-lactalbumin nanomembrane as a dense surface layer and the PP membrane as a support layer. The use of the dialysis membrane in the removal of urea, creatinine, β-microglobulin and indoxyl sulfate was the same as that in Embodiment 9. The experimental results show that the use of the dialysis membrane in the removal of urea, creatinine, β-microglobulin and indoxyl sulfate was the same as that in Embodiment 9; and the dialysis membrane can completely intercept the macromolecular bovine serum albumin; and has better removal effects for indoxyl sulfate, urea, β-microglobulin, and creatinine; and the removal ratios were respectively 35.1%, 89.2%, 51.4% and 87.5%.

Embodiment 12

A pH value of a 60 μL 50 mmol/L 2-[4-(2-hydroxyethyl)piperazin-1-yl]ethanesulfonic acid buffered solution of tris (2-carboxyethyl) phosphine was adjusted to 6.0 by using NaOH; and then, the adjusted solution was mixed with a 60 μL 2 mg/mL 2-[4-(2-hydroxyethyl)piperazin-1-yl]ethanesulfonic acid buffered solution of insulin evenly before directly spreading a resulting mixture to a whole surface of a 18 mm×18 mm cover glass; and the mixed solution was incubated at room temperature for 2 hours to form a layer of insulin two-dimensional nanomembrane on a gas-liquid interface of a liquid on the cover glass; the insulin two-dimensional nanomembrane on the gas-liquid interface was transferred to a 1-ethyl-(3-dimethylaminopropyl) carbodiimide hydrochloride aqueous solution having a mass fraction of 1%, and then crosslinked for 2 hours at room temperature to obtain a crosslinked insulin nanomembrane. The obtained crosslinked insulin nanomembrane was attached on a PSF membrane with a diameter of 25 mm, a thickness of 12 μm and a pore size of 10 μm to obtain a dialysis membrane with the crosslinked insulin nanomembrane as a dense surface layer and the PSF membrane as a support layer. The use of the dialysis membrane in the removal of urea, creatinine, β-microglobulin and indoxyl sulfate was the same as that in Embodiment 9. The experimental results show that the use of the dialysis membrane in the removal of urea, creatinine, β-microglobulin and indoxyl sulfate was the same as that in Embodiment 9; and the dialysis membrane can completely intercept the macromolecular bovine serum albumin; and has better removal effects for indoxyl sulfate, urea, β-microglobulin, and creatinine; and the removal ratios were respectively 32.1%, 83.6%, 50.1% and 86.1%.

The invention claimed is:
1. A method for dialysis using a crosslinked lysozyme-based dialysis membrane,
wherein the crosslinked lysozyme-based dialysis membrane comprising
a glutaraldehyde crosslinked lysozyme nanomembrane as a dense surface layer, and
a PET nuclear track membrane as a support layer,
the glutaraldehyde crosslinked lysozyme nanomembrane is attached on the PET nuclear track membrane, and
the glutaraldehyde crosslinked lysozyme nanomembrane is formed by crosslinking a lysozyme two-dimensional nanomembrane with glutaraldehyde, and the lysozyme two-dimensional nanomembrane is formed by lysozyme phase transition;
wherein the lysozyme two-dimensional nanomembrane is formed by a method comprising:
adjusting a pH value of a 10-100 mmol/L 2-[4-(2-hydroxyethyl)piperazin-1-yl]ethanesulfonic acid buffered solution of tris(2-carboxyethyl) phosphine to 6.0-8.0 by using NaOH to get an adjusted solution, then mixing the adjusted solution with a 1-30 mg/mL 2-[4-(2-hydroxyethyl)piperazin-1-yl]ethanesulfonic acid buffered solution of lysozyme in an isovolumetric manner to get a mixed solution, spreading the mixed solution to a whole surface of a substrate directly, incubating at room temperature for 2-6 hours, forming a layer of the lysozyme two-dimensional nanomembrane on a gas-liquid interface of a liquid on the substrate;
the glutaraldehyde crosslinked lysozyme nanomembrane is formed by a method comprising:
transferring the lysozyme two-dimensional nanomembrane to a glutaraldehyde aqueous solution with a mass fraction of 0.2%-2% for crosslinking for 2-6 hours at the room temperature;
wherein a thickness of the PET nuclear track membrane is 12 μm, and a pore size of the PET nuclear track membrane is in a range of 1-10 μm; and
wherein the dialysis comprises separating of mixed proteins from each other, the mixed proteins are bovine serum albumin and insulin, or muscle hemoglobin and insulin;
the dialysis comprises separating of mixed dyes from each other, the mixed dyes are methyl blue and methyl orange, or methyl blue and Rhodamine B; or
the dialysis comprises removing urotoxin from blood, the urotoxin is any one of urea, creatinine, β-microglobulin and indoxyl sulfate.

* * * * *